(12) United States Patent
Wright

(10) Patent No.: US 11,292,009 B2
(45) Date of Patent: Apr. 5, 2022

(54) GYPSUM WASHER

(71) Applicant: Randy Wright, Victorville, CA (US)

(72) Inventor: Randy Wright, Victorville, CA (US)

( * ) Notice: Subject to any disclaimer, the term of this patent is extended or adjusted under 35 U.S.C. 154(b) by 0 days.

(21) Appl. No.: 16/936,113

(22) Filed: Jul. 22, 2020

(65) Prior Publication Data

US 2022/0023875 A1    Jan. 27, 2022

(51) Int. Cl.
*B03B 5/56* (2006.01)
*B03B 9/06* (2006.01)

(52) U.S. Cl.
CPC ............... *B03B 5/56* (2013.01); *B03B 9/063* (2013.01)

(58) Field of Classification Search
CPC .................................. B03B 5/56; B03B 9/063
USPC ........................................................ 209/452
See application file for complete search history.

(56) References Cited

U.S. PATENT DOCUMENTS

| | | | | |
|---|---|---|---|---|
| 4,339,043 A | * | 7/1982 | Tice | .......................... B03B 5/26 209/251 |
| 5,143,308 A | * | 9/1992 | Hally | ...................... B29B 17/02 241/76 |
| 5,894,936 A | * | 4/1999 | Sanders | .................. A01K 61/59 209/270 |
| 8,182,551 B1 | * | 5/2012 | Meyerhoeffer, Jr. | ........................ D06F 31/005 8/142 |
| 2014/0117124 A1 | * | 5/2014 | Brosseuk | .................. B03B 5/26 241/20 |

FOREIGN PATENT DOCUMENTS

| | | | | |
|---|---|---|---|---|
| EP | 1118706 A2 | * | 7/2001 | ............. D21B 1/325 |
| EP | 2346617 B1 | * | 4/2014 | ............... B07B 1/24 |
| KR | 100863349 B1 | * | 10/2008 | |
| WO | WO-9216686 A1 | * | 10/1992 | ............. D21B 1/322 |

* cited by examiner

*Primary Examiner* — Terrell H Matthews
(74) *Attorney, Agent, or Firm* — Averill & Green; Kenneth L. Green

(57) ABSTRACT

A gypsum washer includes a rotating trommel receiving raw material and a flow of water, and having paddles tilted to reduce impacts of the gypsum passing through the trommel while still providing a washing action. Bentonite separates from the gypsum in the trommel, liquifies, and is released through a mesh screen at the end of the trommel separating from the gypsum. The gypsum is released from the trommel into a water fed trough, scooped from the trough, and released into a storage area. The liquified bentonite is carried by a water flow into one or more settlement tanks, and recovered for use.

20 Claims, 3 Drawing Sheets

GYPSUM WASHER

BACKGROUND OF THE INVENTION

The present invention relates to washing gypsum and in particular to machinery for washing and separating bentonite from gypsum.

Known machines for washing gypsum are expensive and cumbersome. There is also value in recovering bentonite washed from the gypsum. A new gypsum washer is needed to reduce cost and recover the bentonite.

BRIEF SUMMARY OF THE INVENTION

The present invention addresses the above and other needs by providing a gypsum washer including a rotating trommel receiving raw material and a flow of water, and having paddles tilted to reduce impacts of the gypsum passing through the trommel while still providing a washing action. Bentonite separates from the gypsum in the trommel, liquifies, and is released through a mesh screen at the end of the trommel separating from the gypsum. The gypsum is released from the trommel into a water fed trough, scooped from the trough, and released into a storage area. The liquified bentonite is carried by a water flow into one or more settlement tanks, and recovered for use.

In accordance with one aspect of the invention, there is provided a gypsum washer including a rotating trommel for washing gypsum in raw material and liquifying bentonite to separate from the gypsum. The rotating trommel includes several paddles tilted opposite the trommel's rotation to reduce impacts of the gypsum passing through the trommel while still providing a washing action. A preferred paddle is about five inches long and preferably tilted between 35 and 40 degrees, and more preferably tilted about 37 degrees opposite the rotation of the trommel. A preferred rotation rate is between 8 and 15 RPM and a more preferred rotation rate is about ten RPM. The trommel is preferably 31 feet long and 36 inches in diameter, is preferrably tilted at an adjustable angle between five and 10 degrees to provide a flow of raw material and water, the tilt based on the raw material being cleaned, and has a material retention time of between 20 and 30 seconds to scrub the bentonite/gypsum slurry against itself to aid the separation of the bentonite clay from the gypsum. In the scrubbing process the bentonite separates from the gypsum by scrubbing the gypsum particles against each other in the rotating trommel.

In accordance with another aspect of the invention, there is provided a gypsum washer including a rinse cycle. The rinse cycle receives washed gypsum from the trommel. The rinse cycle includes an 18 feet long auger rotating at between two and ten revolutions per hour. The slow rotation rinses residual bentonite from the gypsum to bring the gypsum purity level to a preferred level.

In accordance with yet another aspect of the invention, there is provided a gypsum washer including a dewatering process after the rinse cycle. The dewatering process removes 70 and 95% of the water from the gypsum. After the dewatering process, the gypsum is moved by conveyor to either a stockpile to be dried in the open air or to a fueled drying machine.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within seven percent of a stated value.

Figure 1:
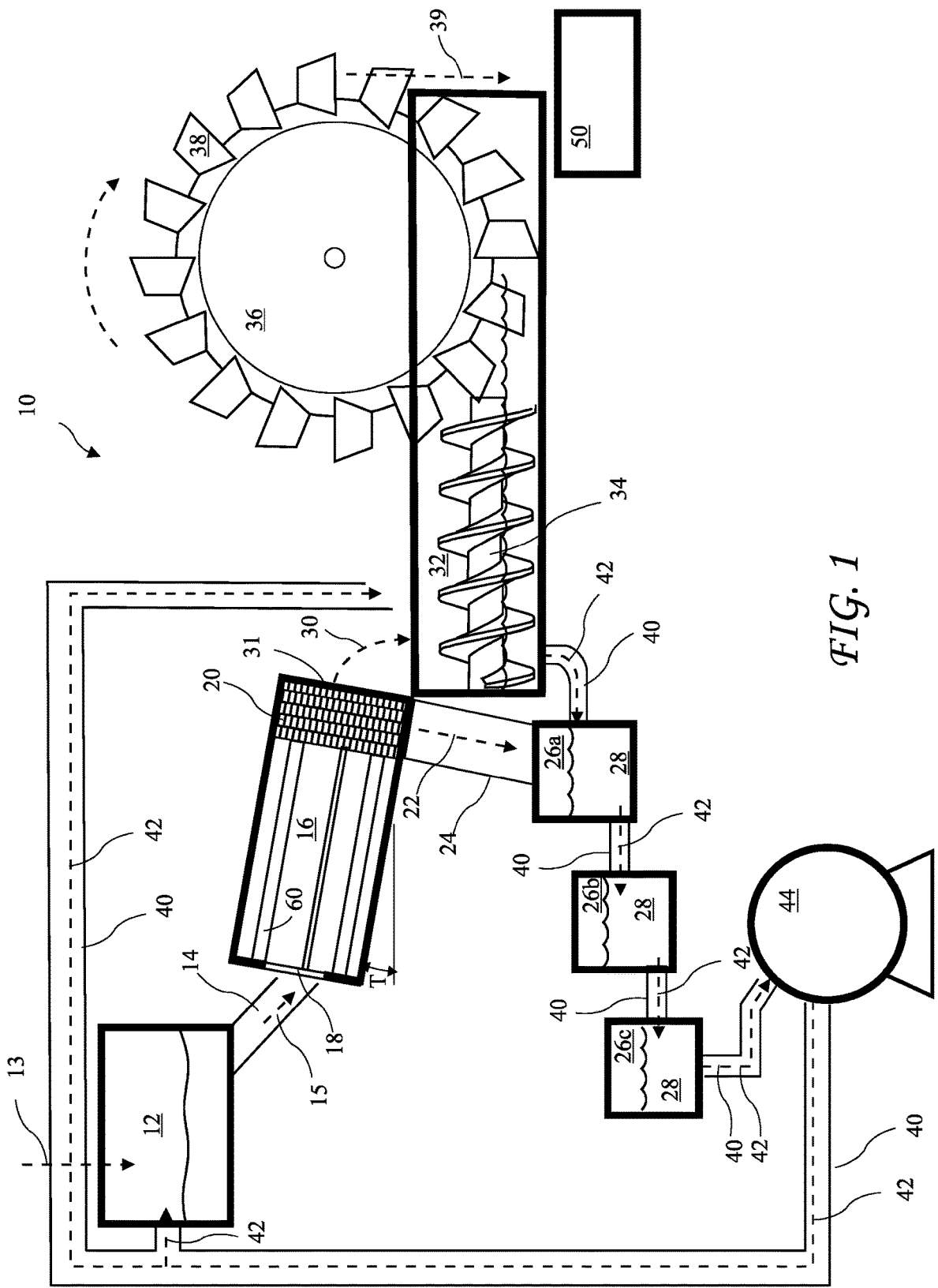
FIG. 1 shows a gypsum washing system according to the present invention.

A gypsum washing system 10 according to the present invention is shown in FIG. 1. The gypsum washing system 10 includes a raw material feeder 12, a trommel 16, at least one bentonite settling tank 26, and a gypsum rinser 32. The raw material feeder 12 receives raw material 13 and circulated water 42 through plumbing 40, and provides a raw material and water slurry 15 into the trommel 16 through a feeder chute 14 and into an inlet 18. The trommel 16 is preferably about 31 feet long and about 36 inches in diameter and more preferably 31 feet long and 36 inches in diameter, is tilted preferrably at an adjustable angle between five and ten degrees (based on the raw material being cleaned) to provide a flow of raw material and water, and preferably has a raw material retention time of between 20 and 30 seconds. A preferred trommel 16 rotation rate is between 8 and 15 RPM and a more preferred rotation rate is about ten RPM. The raw material holder 12 is preferably about twelve feet long, about six feet wide, and about six feet deep, and is more preferably twelve feet long, six feet wide, and six feet deep.

A discharge screen 20 opposite to the inlet 18 releases liquified bentonite 22 into at least one bentonite settling tank 26a-26c. The mesh size is generally determined by number of holes per linear inch. This is true for the sizes 40, 30, 20, and 10. Mesh larger the 10 switches systems to the hole dimension of the mesh, for example ⅛" inch mesh. Five meshes are generally used for mesh screen 20: 40 mesh is graded gypsum of 0.0162" and larger; 30 mesh is graded gypsum of 0.0229" and larger; 20 mesh is graded gypsum of 0.0342" and larger; 10 mesh is graded gypsum of 0.062" and larger; and ⅛ inch mesh is graded gypsum of 0.125 inch and larger. The discharge screen 20 is preferably a 20 mesh screen. The mesh screen 20 is preferably attached to the trommel 16 by wrapping the screen 20 around the trommel and connecting 90 deg mounting flanges at each end of the screen 20 using bolts to tightly hold the screen 20 against the trommel 16.

When more than one bentonite settling tank 26a-26c is present, each successive bentonite settling tanks 26a-26c is lower than the preceding bentonite settling tank 26a-26c to provide a gravity flow. Settled bentonite 28 settles in the bentonite settling tanks 26a-26c for later collection. The bentonite settling tank 26a-26c are preferably about 40 feet long, about eight feet wide, and about four feet deep, and more preferably 40 feet long, eight feet wide, and four feet deep. The last bentonite settling tank 26a-26c releases the circulated water 42 to a water pump 44 which pumps the circulated water 42 back to the raw material feeder and to a rinse tank 32. The water pump 44 is preferably a 125 to 300 gallon per minute, about 25 HP, about 300 RPM pump, providing about 50 PSI water pressure into the plumbing 40, and more preferably a 25 HP, 300 RPM pump, providing 50 PSI water. Washed gypsum and water 30 is released past the discharge screen 20 from the trommel 16 through a trommel outlet 31 into a rinse tank 32.

The rinse tank 32 contains an auger 34 urging the washed gypsum and water 30 towards a conveyer, for example, a bucket wheel, bucket belt, or a second auger to lift and extract rinsed gypsum 39 from the rinse tank 32, and release the rinsed gypsum 39 into a rinsed gypsum bin 50. The conveyer is preferably the bucket wheel 36, but may be the bucket belt, either carrying buckets 38.

Figure 2C:
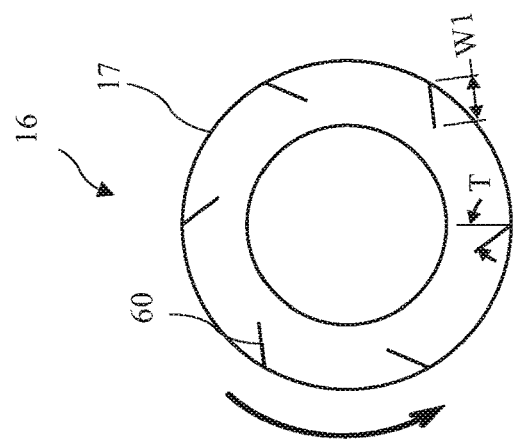
FIG. 2C is a rear view of the trommel of the gypsum washing system according to the present invention.
Figure 2A:
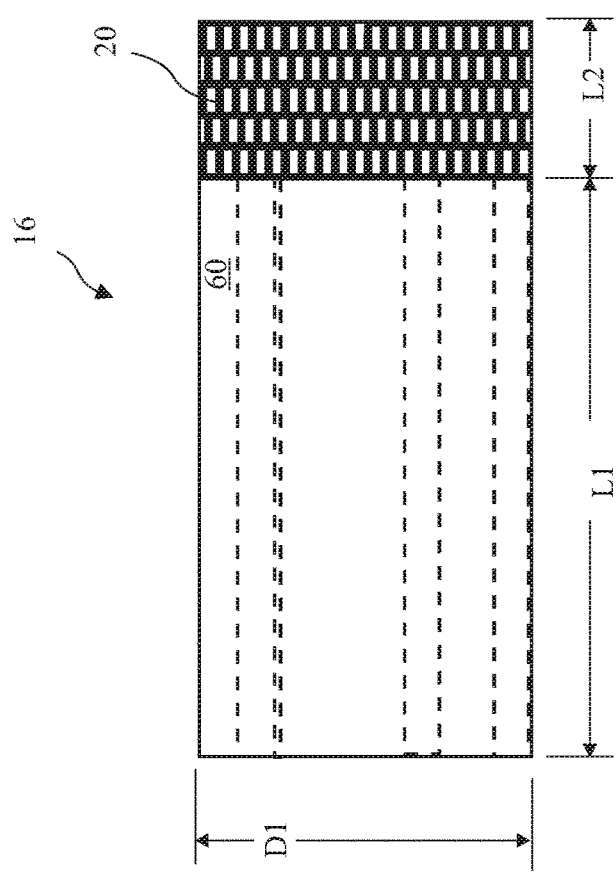
FIG. 2A is a side view of a trommel of the gypsum washing system according to the present invention.
Figure 2B:
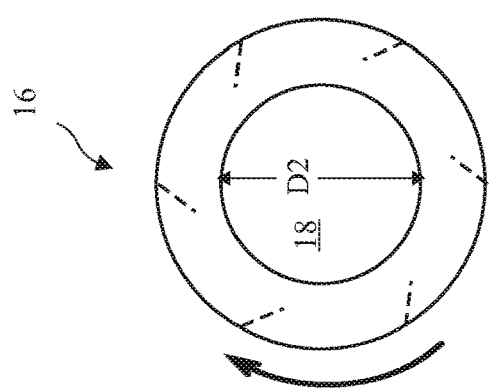
FIG. 2B is a front view of the trommel of the gypsum washing system according to the present invention.

A side view of the trommel 16 is shown in FIG. 2A, a front view of the trommel 16 is shown in FIG. 2B, and a rear view of the trommel 16 is shown in FIG. 2C. The trommel has a diameter D1 and lengths L1 and L2, and the trommel inlet 18 has diameter D2. The diameter D1 is preferably about 36 inches, the diameter D2 is preferably about 20 inches, and the length L1 is preferrably about 27 feet and L2 is preferably about three feet. More preferably the diameter D1 is 36 inches, the diameter D2 is 20 inches, length L1 is 27 feet and L2 is three feet.

The trommel 16 includes several paddles 60 reaching in from a trommel housing 17 and tilted away from the trommel's rotation to reduce impacts of the gypsum passing through the trommel while still providing a washing action. Preferrably five to seven and more preferably six paddles having a width W1 and tilted T degrees opposite the rotation of the trommel 16 rotation. The width W1 is preferably about five inches and width W1 is more preferably five inches. The tilt T is preferably between 35 and 40 degrees, and more preferably tilted about 37 degrees.

Figure 3A:
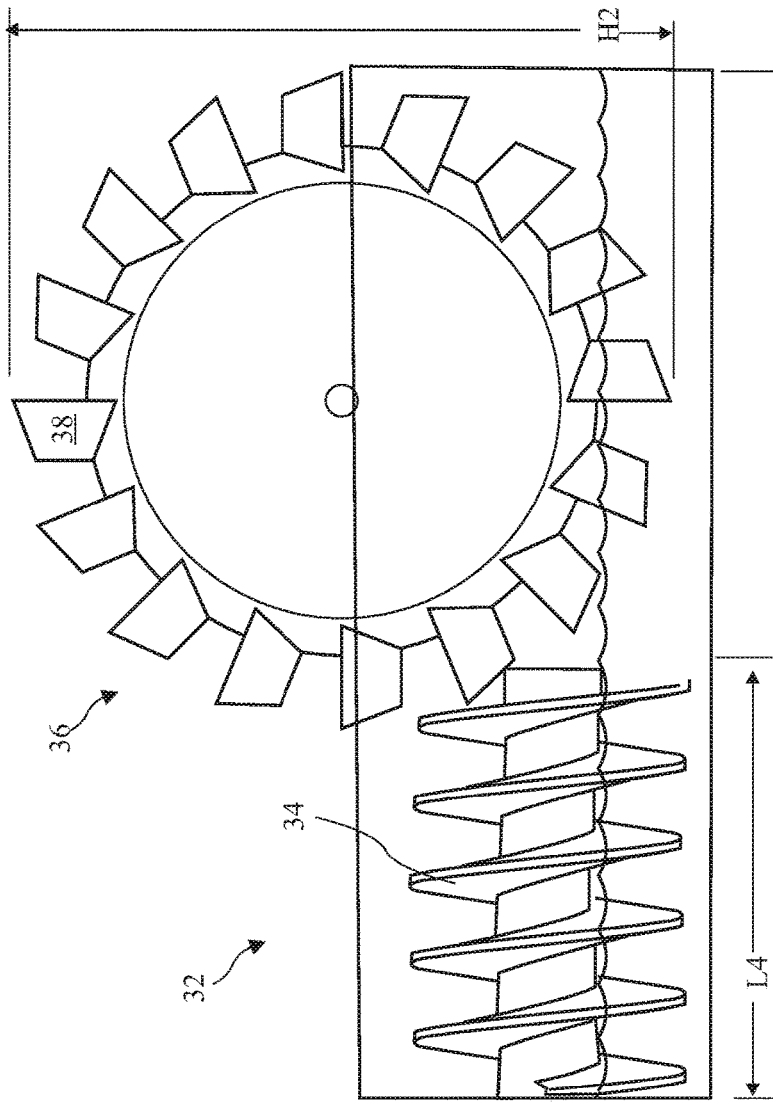
FIG. 3A is a side view of a rinser tank of the gypsum washing system according to the present invention.
Figure 3B:
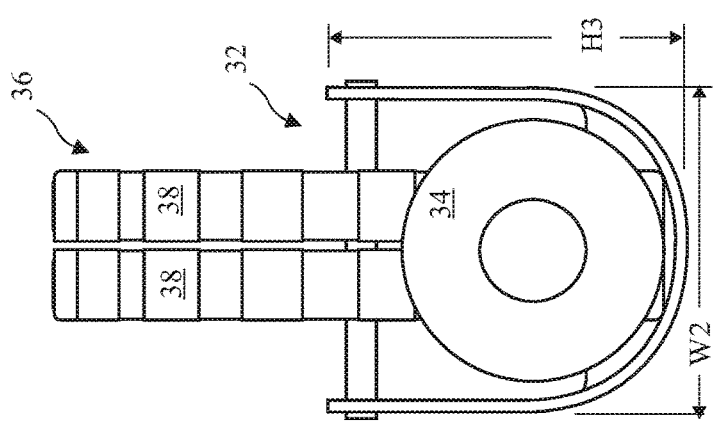
FIG. 3B is a front view of the rinser tank of the gypsum washing system according to the present invention.

A side view of the rinser tank 32 is shown in FIG. 3A and a front view of the rinser tank 32 is shown in FIG. 3B. The rinser tank 32 has a length L3, a width W2, a height H3, and a rounded bottom. The length L3 is preferably about 31 feet and more preferably is 31 feet. The width W2 is preferably about eight feet and more preferably is eight feet. The height H3 is preferably about seven feet and more preferably is seven feet. The bucket wheel has a height H2. The height H2 is preferrably about twelve feet and more preferably is twelve feet.

Figure 4:
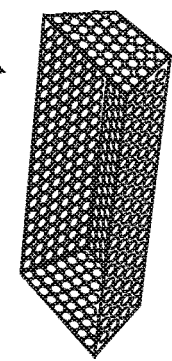
FIG. 4 is a perspective view of a bucket of the gypsum washing system according to the present invention.
Figure 5B:
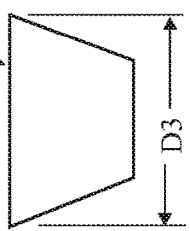
FIG. 5B is a side view of the bucket of the gypsum washing system according to the present invention.
Figure 5A:
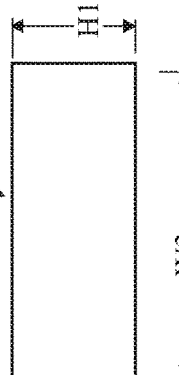
FIG. 5A is a front view of the bucket of the gypsum washing system according to the present invention.

A perspective view of the bucket 38 is shown in FIG. 4, a front view of the bucket 38 is shown in FIG. 5A, and a side view of the bucket 38 is shown in FIG. 5B. The buckets 38 have a width W2, depth D3, and height H1. The width w2 is preferably about 24 inches and more preferably is 24 inches, the depth D3 is preferably about eight inches and more preferably is eight inches, and the height H1 is preferably about eight inches and more preferably is eight inches. The buckets 38 are preferably made from 0.25 inch thick hole punch metal plate having 0.25 inch diameter holes. The auger 34 has a length L4 of between sixteen and eighteen feet.

While the invention herein disclosed has been described by means of specific embodiments and applications thereof, numerous modifications and variations could be made thereto by those skilled in the art without departing from the scope of the invention set forth in the claims.

I claim:

1. A gypsum washer comprising:
   a raw material feeder in fluid communication with plumbing to receive circulating water from the plumbing and, the raw material feeder containing raw gypsum material;
   a rotating trommel in fluid communication with the raw material feeder to receive the raw gypsum material and the circulating water in a slurry from the raw material feeder, the rotating trommel comprising:
      a trommel inlet at a first end, the slurry from the raw material feeder entering the trommel through the trommel inlet;
      paddles inside the trommel;
      a discharge screen at a second end opposite to the trommel inlet;
      a trommel outlet opposite to the trommel inlet and after the discharge screen, washed gypsum and water released through the trommel outlet; and
      the trommel tilted down from the trommel inlet to the trommel outlet;
   at least one bentonite settling tanks in fluid communication with the trommel through the discharge screen to receive liquified bentonite washed from the raw gypsum material and water slurry;
   a water pump in fluid communication with a last one of the at least one bentonite settling tanks to receive circulating water from the at least one bentonite settling tank, the water pump in fluid communication with the plumbing to pump the circulating water into the plumbing; and
   a rinser tank receiving the washed gypsum and water from the trommel outlet and comprising;
      an auger to advance the washed gypsum through the riser tank; and
      conveyer reaching into the rinser tank to extract the washed gypsum and release the washed gypsum outside the riser tank.

2. The gypsum washer of claim 1, wherein the paddles reach into the trommel from a trommel housing and tilted away from the rotation of the trommel.

3. The gypsum washer of claim 2, wherein the paddles are about five inches long.

4. The gypsum washer of claim 2, wherein the paddles are tilted away from the rotation of the trommel between 35 and 40 degrees.

5. The gypsum washer of claim 2, wherein the paddles are tilted away from the rotation of the trommel about 37 degrees.

6. The gypsum washer of claim 2, wherein the paddles comprise between 5 and seven paddles.

7. The gypsum washer of claim 2, wherein the trommel rotates at between 8 and 15 RPM.

8. The gypsum washer of claim 2, wherein the trommel is about 36 inches in diameter.

9. The gypsum washer of claim 2, wherein the discharge screen is a 20 mesh screen.

10. The gypsum washer of claim 2, wherein the discharge screen reaches axially three feet.

11. The gypsum washer of claim 2, wherein the water pump is configured to pump 125 to 300 gallon per minute and provide about 50 PSI water pressure into the plumbing.

12. The gypsum washer of claim 2, wherein the water pump about 25 HP and about 300 RPM.

13. The gypsum washer of claim 1, wherein:
the paddles comprise five to seven paddles about five inches long and tilted away from the rotation of the trommel between 35 and 40 degrees;
the trommel is about 36 in diameter, about 30 feet long, and rotates at between 8 and 15 RPM; and
the discharge screen reaches axially three feet and is a 20 mesh screen.

14. A gypsum washer comprising:
a raw material feeder in fluid communication with plumbing to receive circulating water from the plumbing, the raw material feeder containing raw gypsum material;
a rotating trommel 36 in diameter, 30 feet long, and rotates at between 8 and 15 RPM, the trommel in fluid communication with the raw material feeder to receive the raw gypsum material and the circulating water in a slurry from the raw material feeder, the rotating trommel comprising:
a trommel inlet at a first end, the slurry from the raw material feeder entering the trommel through the trommel inlet;
between five and seven paddles about five inches long and tilted away from the rotation of the trommel between 35 and 40 degrees, reaching inside the trommel;
a discharge screen at a second end opposite to the trommel inlet reaching axially three feet and comprising a 20 mesh screen;
a trommel outlet opposite to the trommel inlet and after the discharge screen, washed gypsum and water released through the trommel outlet; and
the trommel tilted down from the trommel inlet to the trommel outlet;
at least one bentonite settling tanks in fluid communication with the trommel through the discharge screen to receive liquified bentonite washed from the raw gypsum material and water slurry;
a 25 HP and 300 RPM water pump in fluid communication with a last one of the at least one bentonite settling tanks to receive circulating water from the at least one bentonite settling tank, the water pump in fluid communication with the plumbing configured to pump 125 to 300 gallon per minute and provide about 50 PSI water pressure into the plumbing; and
a rinser tank receiving the washed gypsum and water from the trommel and comprising;
an auger to advance the washed gypsum through the riser tank; and
conveyer reaching into the rinser tank to extract the washed gypsum and release the washed gypsum outside the riser tank.

15. The gypsum washer of claim 1, wherein the water pump receives the circulating water from a bottom of the at least one bentonite settling tank.

16. The gypsum washer of claim 15, wherein:
the at least one bentonite settling tanks at least two bentonite settling tanks comprising:
a first bentonite settling tank receiving the liquified bentonite washed from the raw gypsum material and water slurry through the discharge screen;
a last bentonite settling tank receiving the liquified bentonite washed from the raw gypsum material and water slurry through the plumbing in fluid communication with a prior one of the at least two bentonite settling tanks, the fluid communication above a bottom of the prior one of the at least two bentonite settling tanks; and
the water pump receives the circulating water from the bottom of the last bentonite settling tank.

17. The gypsum washer of claim 1, further including a bucket wheel in the rinse tank and including buckets reaching past the rinse tank to release rinsed gypsum into a rinsed gypsum bin.

18. The gypsum washer of claim 17, further including:
a first end of the rinse tank under the trommel outlet;
a second end of the rinse tank opposite to the first end;
the bucket wheel at the second end of the rise tank; and
an auger in the rinse tank reaching from the first end and proximal to the bucket wheel and not interfering with rotation of the bucket wheel.

19. The gypsum washer of claim 18, wherein the rinse tank has a "U" shaped cross-section with an open top.

20. The gypsum washer of claim 19, wherein the bucket wheel has a height H2 of about twice the rinse tank height H3.

* * * * *